INVENTORS
ANDREW HERCZOG
AND STANLEY D. STOOKEY

BY Clarence R. Patty Jr.
ATTORNEY

INVENTORS
ANDREW HERCZOG
AND STANLEY D. STOOKEY

BY Clarence R. Patty
ATTORNEY

July 13, 1965 A. HERCZOG ETAL 3,195,030
GLASS AND METHODS OF DEVITRIFYING SAME
AND MAKING A CAPACITOR THEREFROM
Filed June 26, 1964 7 Sheets-Sheet 7

INVENTORS
ANDREW HERCZOG
AND STANLEY D. STOOKEY

BY Clarence R. Patty, Jr.
ATTORNEY

United States Patent Office 3,195,030
Patented July 13, 1965

3,195,030
GLASS AND METHODS OF DEVITRIFYING SAME AND MAKING A CAPACITOR THEREFROM
Andrew Herczog, Painted Post, and Stanley D. Stookey, Corning, N.Y., assignors to Corning Glass Works, Corning, N.Y., a corporation of New York
Filed June 26, 1964, Ser. No. 378,468
32 Claims. (Cl. 317—258)

This application is a continuation-in-part of our pending application Serial No. 30,413 filed May 18, 1960 which application in turn was a continuation-in-part of Serial No. 824,428 filed July 1, 1959, both now abandoned.

This invention relates to the manufacture of ceramic bodies having high dielectric constants and other desirable dielectric properties.

One of the earliest methods for making electrical capacitors involved the vertical stacking of thin sheets of mica, mica being well-known in the art for its dielectric properties. Later, thin sheets of a glass possessing a high dielectric constant were substituted for the mica. However, these products did not exhibit as high dielectric strengths as some crystalline compounds, the most prominent of these being barium titanate ($BaTiO_3$). Considerable research, then, has been directed toward means for making sound bodies from these crystalline materials.

Heretofore, such bodies have usually been made by molding and shaping a batch to form a body comprising finely divided ferroelectric crystalline compounds having the desired dielectric properties, such as $BaTiO_3$ and/or various niobates either alone or in mixture with other titanates or zirconates or stannates together with very small amounts of siliceous or argillaceous bonding materials, and sintering the body without melting or otherwise altering its ferroelectric crystalline components. While the prior products have good and desirable dielectric properties, new compositions having still better dielectric properities are constantly being sought. The prior process has from time to time been improved with benefit to the uniformity and homogeneity of the product and to the reduction of its porosity and voids but perfection in such qualities has not yet been attained. The prior process as now practiced consumes considerable time for the control of homogeneity and particle size which requires repeated ball milling and fritting of the batch before it is molded and fired. The molded body requires firing at 1100°–1300° C. for its proper sintering and maturing, as a result of which only platinum or palladium electrodes can be applied to the body in the green or unfired state because the cheaper silver and copper electrodes will not withstand such high temperatures. Moreover, the prior process is not well adaptable to produce sheets as thin as are desirable for the fabrication of some types of laminated capacitors, comprising a large number of dielectric layers for obtaining high capacitance per unit volume.

Such bodies have also been produced by melting a batch of the ingredients and then cooling this melt to room temperature at a rate slowly enough to cause devitrification to occur. Another method involves the melting of the batch materials, maintaining this melt at such a temperature (generally at about the liquidus temperature) that crystallization will occur in the melt and then quenching the melt to room temperature. Still another modification contemplates the incomplete melting of the batch materials such that a melt is obtained wherein unmelted particles of very small size are present therein to act as nuclei for the growth of crystals as the melt is maintained at a specified temperature. After the desired growth of crystals has occurred, the melt is quenched to room temperature. The crystallization resulting from these processes is very non-uniform in the size of the crystals and the dispersion thereof in the glassy matrix is non-homogeneous. Hence, the exceptional dielectric properties of the base materials cannot be utilized to the best advantage.

The primary object of this invention is to provide semi-crystalline ceramic bodies, having high dielectric constant and other useful properties for electrical applications, which can easily be obtained in the form of very thin sheets or in other useful forms in the glassy state and processed to the finished products in the same shape at much lower temperatures than similar materials known from the prior art.

Another object is to provide high dielectric constant materials with better breakdown strength and/or insulation resistance than similar prior materials.

Still another object is to provide an improved method of making semicrystalline ceramic bodies of high dielectric constant which provides a very wide range of control of dielectric properties by variations of conditions of processing.

A further object is to provide new compositions suitable for the production of such bodies by such method and for obtaining a wide range of characteristics desired for various applications.

Another object is to provide a laminated capacitor comprising a semicrystalline ceramic dielectric made according to the invention.

Another object is to provide a new method for fabrication of a laminated capacitor comprising a semicrystalline ceramic dielectric.

To these and other ends the invention embodies among its features a semicrystalline ceramic body, a method of making the body, new compositions for making the body by said method, an article comprising the body, and a method of making such article, to be hereinafter more fully described and illustrated in the accompanying drawing in which.

Figure 3:
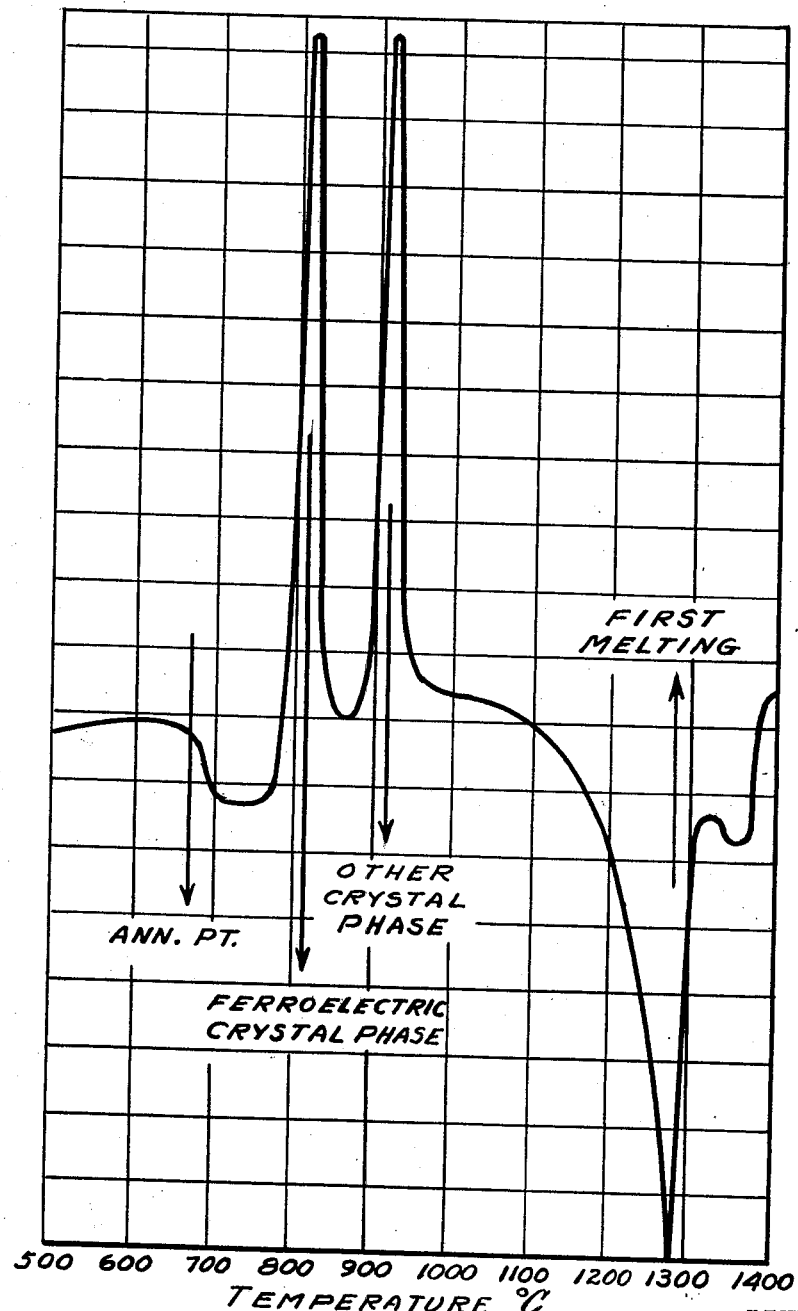
Figure 4:
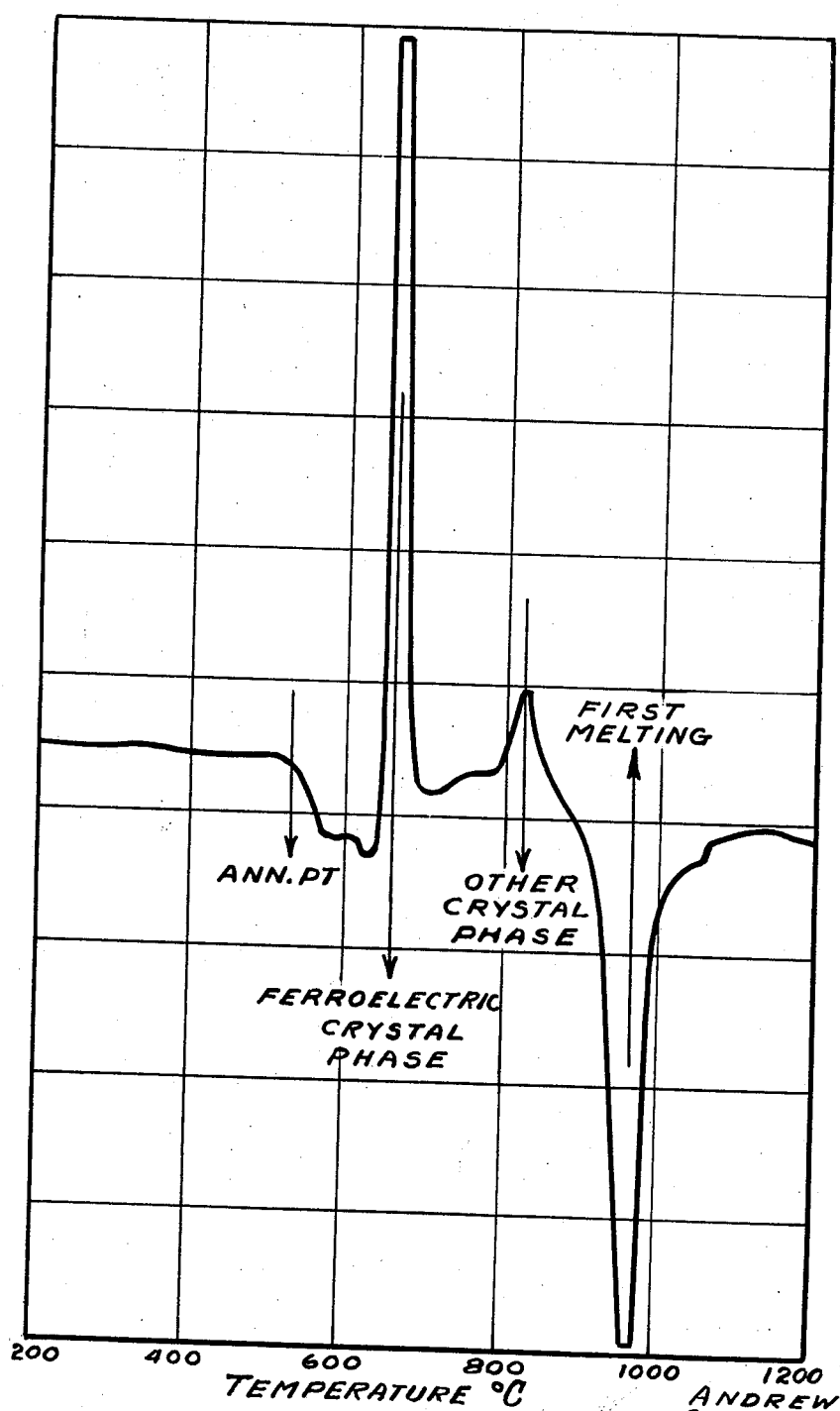
Figure 5:
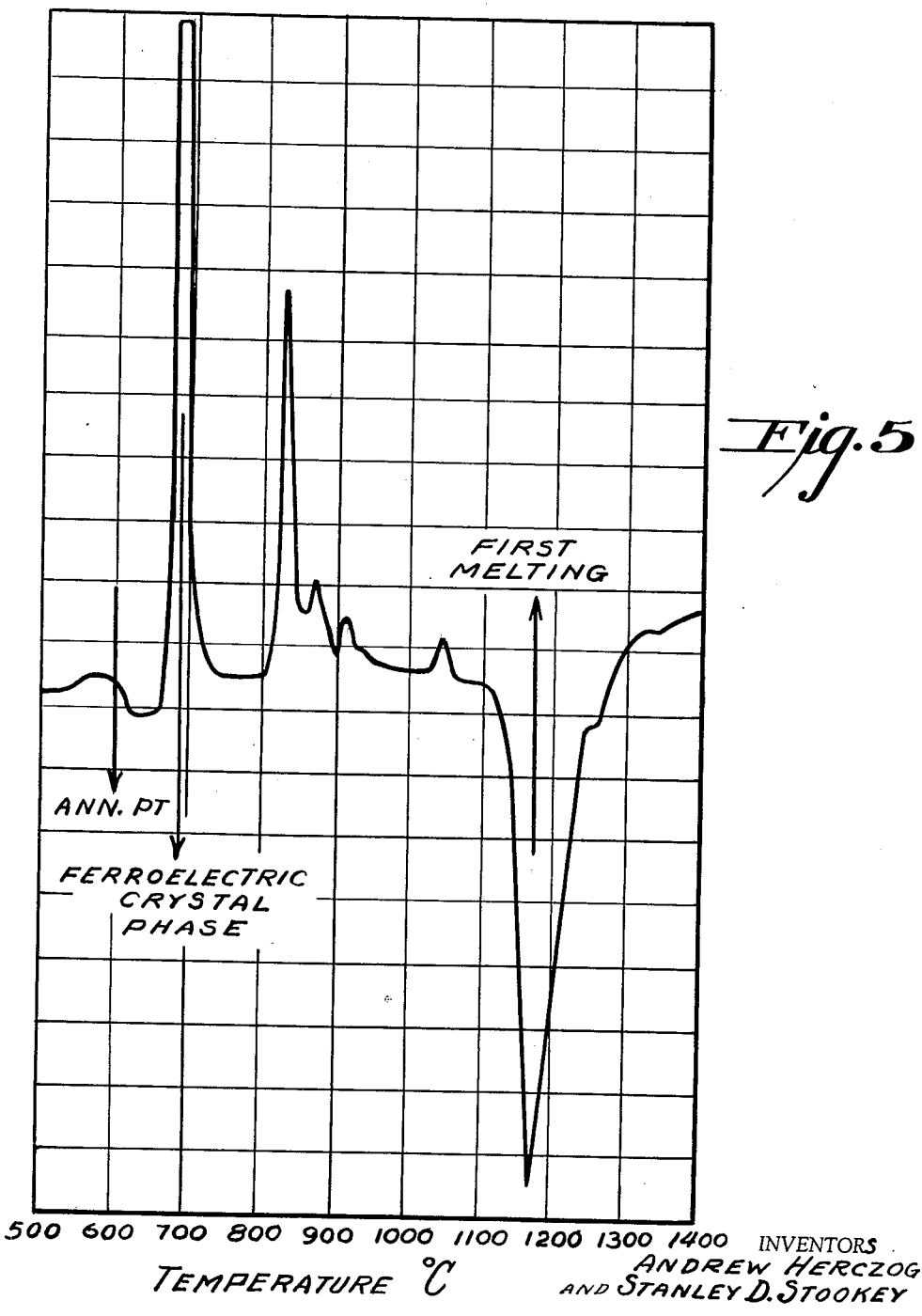
Figure 6:
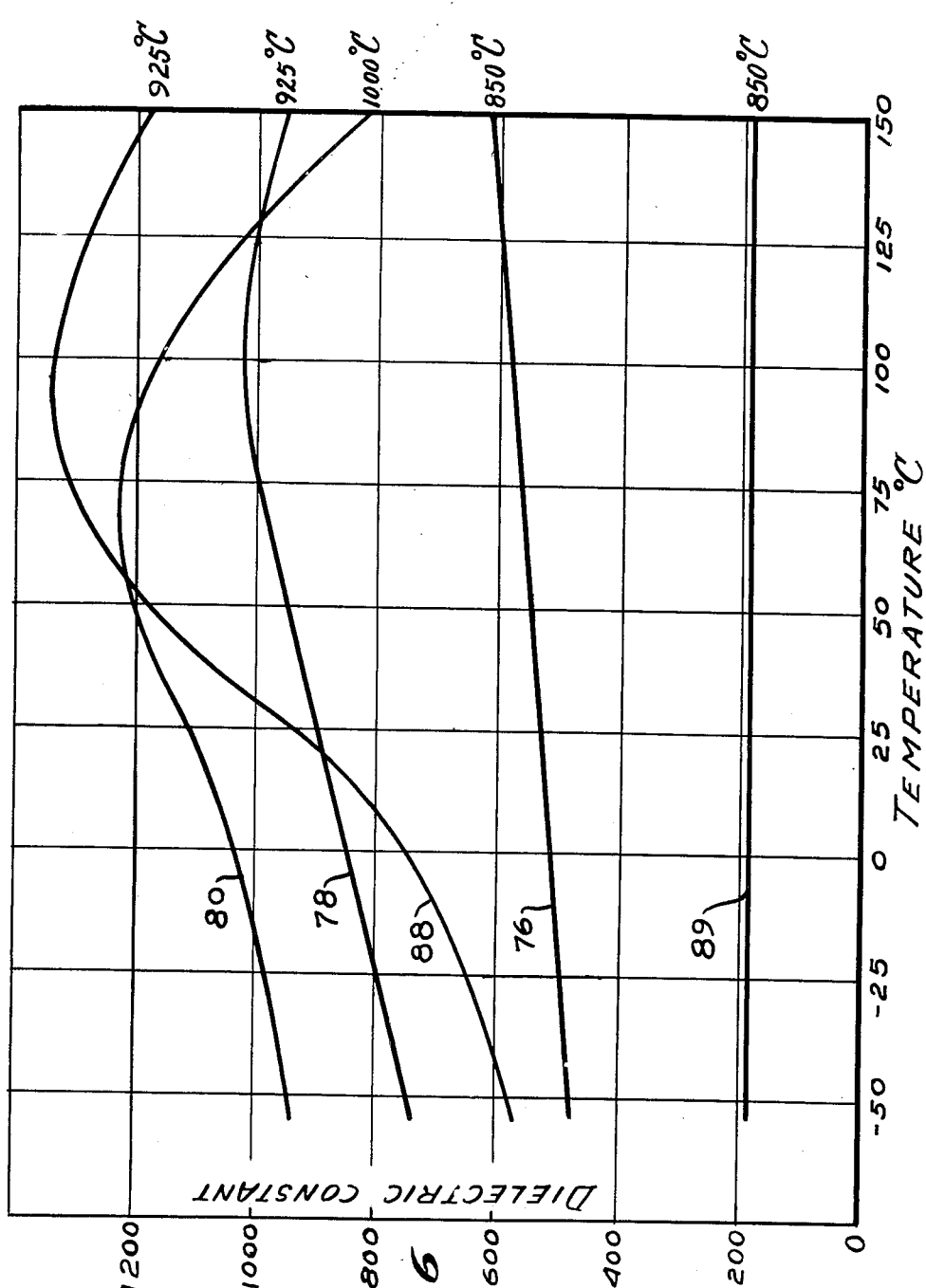
Figure 7:
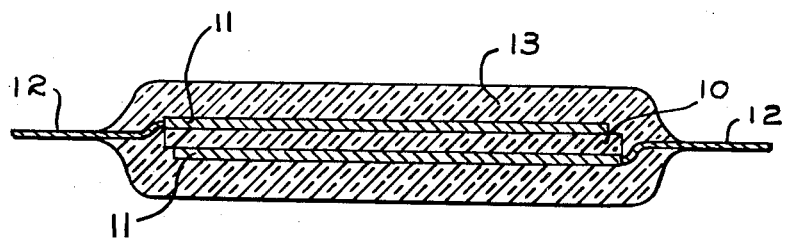

FIG. 3 is a graphical representation of a curve produced by the Differential Thermal Analysis or DTA of a glass composition consisting essentially of BaO, $TiO_2$, $SiO_2$, and $Al_2O_3$ in accordance with the invention showing the approximate temperatures of the annealing point of the glass, the formation of the ferroelectric crystal phase therein and the melting of such phase as the temperature of the glass is progressively raised;

FIG. 4 is a graphical representation of a DTA curve similar to that of FIG. 3 but illustrating a glass composition consisting essentially of BaO, TiO$_2$, B$_2$O$_3$ and CaO and showing the approximate temperatures of the annealing point, crystal phase formation and melting of the glass;

FIG. 5 is a graphical representation of the DTA curve of a glass composition consisting essentially of Nb$_2$O$_5$, Na$_2$O, CdO, and SiO$_2$ and showing the approximate temperature of the annealing point, crystal phase formation and melting of the glass;

FIG. 6 is a graphical representation in which the relationship between dielectric constant and temperature of some of the semicrystalline bodies of this invention is shown by a series of curves; and FIG. 7 is a sectional elevation of a capacitor showing its internal structure comprising alternate layers of an electrically conducting material and of a dielectric material made in accordance with the invention.

We have discovered that a ceramic body containing at least one ferroelectric crystalline phase and possessing a high dielectric constant, conventionally and hereinafter designated "K," a low dissipation factor or loss tangent, "L.T.," and higher breakdown voltage and insulation resistance than the prior products, together with other desirable physical and electrical properties, can be made by the controlled crystallization by heat treatment of a glass body of desired size and shape, having constituent oxides capable of combing to form such a ferroelectric crystalline phase or phases.

As used herein, the expression "semicrystalline ceramic body" means a body composed of a multiplicity of uniform very fine-grained crystals substantially homegeneously dispersed in a glassy matrix and forming a major proportion thereof, said body being produced by melting a glass-forming batch containing the proper ingredients, cooling the melt to a glass and simultaneously forming a shape of the desired configuration, and then heat treating this glass shape in a particular manner to cause crystals to develop in situ.

The new products, originating as they do from homogeneous glasses made from fluid melts, possess zero porosity, optimum homogeneity and uniform dispersal of the crystalline phase or phases in very small particle size, as a result of which their resistitives reach $10^{11}$ ohm. cm. at temperatures up to 400° C., and their dielectric constants and breakdown voltages are unexpectedly higher than those of bodies having the same or substantially the same oxide compositions but compounded and sintered in accordance with prior practice. The temperature of its heat treatment has an extremely large effect on the value of K of a body so made and provides a convenient and useful means for its control.

Furthermore, the thermal expansion coefficients of the original glass and the semicrystalline product derived therefrom are, in some cases at least, so nearly alike in value that breaking stresses are not established in relatively thin bodies, such as sheets, which may also be locally heat treated and crystallized to form regions of different "K" values in various portions. In such cases, any change in volume of the semi-crystalline portion during its crystallization is allowed to take place by the relatively low viscosity of the surrounding glass which is characteristic of these glasses above their softening point and which permits volume readjustment.

As a rule, the glasses of this invention soften without crystallization at about 10°–50° C. or more below the temperature at which crystallization begins. This permits sealing one piece of the glass to another before crystallizing them and is highly advantageous for making intricate shapes by pulverizing the glass, molding it and sintering the molded body at its softening point before crystallizing it.

We have found that the ferroelectric compounds tend to form and crystallize before other phases at temperatures in the overall range from about 700°–1100° C. and that because of low formation temperatures fewer defective or oxygen deficient crystals are formed by the new process than by the prior sintering process, which is of further benefit to the dielectric properties of the new product. Moreover, a wider variety of compositions is now possible and electrodes of silver and copper can be applied to the glass body and successfully fired with the body to the final semicrystalline state, since in this temperature range such metal electrodes are not adversely affected.

Ferroelectric compounds in general are divided into four classes of which the family of compounds called the "oxygen-octahedra family," characterized by an octahedral arrangement of oxygen ions in the crystal lattice, includes the ceramic ferroelectrics referred to herein (Proceedings of I.R.E. volume 43, pp. 1738–1793, especially page 1740). The types of oxygen-octahedra ferroelectric compounds, crystallographically designated as "perovskite," the most important group," "pyrochlore" and other types, and also mixtures thereof, are particularly suitable for the purpose of this invention.

Perovskite type ferroelectric compounds have the general oxide formula, ABO$_3$, wherein A and B are ions of large and small radii respectively, the total value of their valences being 6, and individually amounting either to the respective values 3 and 3 as for example in LaGaO$_3$; or to 2 and 4 as in BaTiO$_3$; or to 1 and 5 as in NaNbO$_3$. More generally A ions may be selected from the first, second and third groups of the periodic table and B ions from the second through fifth groups. Other types of the oxygen-octahedra ferroelectric compounds are exemplified by CdNb$_2$O$_6$ and WO$_3$. Solid solubility is wide spread among ferroelectrics and structural oxygen deficiency or excess with respect to the octahedral configuration may be mutually compensated by proper choice of the constituents of solid solutions.

In its broadest embodiment the present invention includes a semicrystalline ceramic body comprising, on the oxide basis, 30–90 cationic mol percent of the constituent oxides of at least one oxygen-octahedra ferroelectric compound, at least 30 cationic mol percent of said body comprising said compound as a crystalline phase uniformly dispersed in another phase, said crystalline phase being crystallized in situ from a homogeneous glass having the same oxide composition as the body and including at least one glass forming oxide, such as SiO$_2$, Al$_2$O$_3$, B$_2$O$_3$, P$_2$O$_5$ and the like which can be cooled from the molten state to form a glass.

While the invention is of general applicability in the production of semicrystalline ceramic bodies containing ferroelectric compounds of the oxygen-octahedra family and mixtures thereof, bodies containing the perovskite type ferroelectric compounds especially BaTiO$_3$, have particularly advantageous properties, and the invention will hereinafter be described, for the sake of brevity, but not by way of limitation, with respect to such preferred bodies and to compositions and methods therefor. Accordingly, the following discussion is chiefly concerned with ferroelectric ceramic bodies in which the ferroelectric crystalline phase is BaTiO$_3$, but the invention in its broader scope includes bodies in which the crystalline phase or phases may comprise one or more of the other ferroelectric compounds of the oxygen-octahedra family or solid solutions or mixtures thereof as will be seen from the compositions hereinafter set forth.

For the production of one group of ferroelectric ceramic bodies containing BaTiO$_3$ it is desirable to include in the composition SiO$_2$ and Al$_2$O$_3$ to promote glass formation. The addition of a small amount of fluorine tends to improve the dielectric properties of the semicrystalline product and the melting characteristics of the glass. We have found that the broadest range of such compositions, on the oxide basis in cationic mol percent, comprises 30–45% BaO, 15–40% $TiO_2$, 7–26% $SiO_2$, 3–30% $AlO_{1.5}$, the amount of $AlO_{1.5}$ not differing from the amount of $SiO_2$ by more than ⅔ of the amount of $SiO_2$, and 0.5–1.5% fluorine, the total BaO, $TiO_2$, $SiO_2$, $AlO_{1.5}$ and fluorine being at least 90%. Preferably, the amount of BaO should be 0–100% in excess of the 1/1 stoichiometric equivalent of $BaTiO_3$ based on the amount of $TiO_2$ present, said excess preferably being higher the lower the amount of $TiO_2$.

Cationic mol percentages are used in the compositions set forth herein in order to avoid the inaccuracies which arise in the calculation on the presumptively oxide basis of mol percentages of compositions having an oxide containing two or more of a given cation. According to this method of designating relative proportions, any given oxide formula is expressed as having one metal atom as the cation. If individual elements are present in any of the compositions herein in presumptively fluoride form, the cationic mol percent of the element is still set forth on the oxide basis. The oxide components of such compositions total 100 cationic mol percent and the fluorine, calculated as $F_2$, is indicated as being extra and is expressed in cationic mol percent of the total. Inasmuch as the amount of fluoride present is quite small, the error arising therefrom is negligible.

A narrower range of compositions falling within the above recited range, in which the presence of fluorine is optional, comprises, on the oxide basis in cationic mol percent, 30–40% BaO, 15–40% $TiO_2$, the amount of BaO being 0–100% in excess of the 1/1 stoichiometric equivalent of $BaTiO_3$ based on the amount of $TiO_2$ present, said excess being higher the lower the amount of $TiO_2$, 9.5–26% $SiO_2$ and 7–25% $AlO_{1.5}$, the amount of $AlO_{1.5}$ not differing from the amount of $SiO_2$ by more than about ⅓ of the amount of $SiO_2$, the total BaO, $TiO_2$, $SiO_2$ and $AlO_{1.5}$ being at least 90%.

The method of utilizing any one of the above-defined compositions in accordance with the invention comprises melting it, cooling it rapidly to form a glass and heat treating the glass by heating it preferably between 850° C. and 1150° C. for a time ranging from at least 1 hour at 850° C. or at least ½ minute at 1150° C. to crystallize the glass. While a minimum time of heating as stated is essential, longer times are not harmful but are economically undesirable. The ferroelectric crystalline phase resulting from such heat treatment is $BaTiO_3$, the advantageous dielectric properties of which are well known.

The above recited ranges of the constituents BaO, $TiO_2$, $SiO_2$, $Al_2O_3$ and F are critical for the purpose of this invention for the following reasons: Since the desired dielectric properties of the semicrystalline products depend primarily upon their contents of crystalline $BaTiO_3$, any substantial departure from the above recited minimum and maximum limiting percentages of BaO and $TiO_2$ will result in an undesirable lowering of the amount of crystallized $BaTiO_3$ and of the dielectric constant. An excess of BaO, up to 100% of the 1/1 stoichiometric equivalent of the amount of $TiO_2$ present, is desirable for the optimum result and such excess is believed to prevent the formation of other titanium compounds, such as the titanosilicates of barium, which lack the beneficial properties of $BaTiO_3$. Such excess should be higher the lower the amount of $TiO_2$ in order to favor the formation of $BaTiO_3$ and hinder the formation of undesired crystal phases.

Compositions containing a deficiency of BaO or, in other words, excess of $TiO_2$ produce some of the benefits of the invention and are within the broader scope thereof. In such case meltability and glass forming ability are maintained either by the excess $TiO_2$ itself or by the presence of an additional oxide or oxides and/or glass forming oxide or oxides.

An excess of $SiO_2$ or a deficiency of $AlO_{1.5}$ above or below the stated limits likewise increases the tendency towards the undesirable formation of silicates and a consequent lowering of the value of K; but too small an amount of $SiO_2$ or too large an amount of $AlO_{1.5}$ causes the molten composition spontaneously to devitrify regardless of the speed of cooling. So as to produce a satisfactory glass, the amount of $AlO_{1.5}$ should not differ from the amount of $SiO_2$ by more than about ⅓ the amount of $SiO_2$ present.

While the presence of fluorine is optional when the amounts of both BaO and $TiO_2$ are close to their maximum, it tends to promote the formation of $BaTiO_3$ and to suppress the formation of less desirable crystalline compounds, particularly when the BaO and $TiO_2$ contents are high. Excessive amounts of fluorine, however, make the glass susceptible to reduction during melting which also causes deterioration of the dielectric properties.

The fluorine is introduced into the glass as a metal fluoride, preferably a fluoride of a metal of the first or second periodic groups, which are thermally more stable than other fluorides. On account of the variation in their molecular weights, the proportion of fluorine per se in such compound will vary depending upon the metal. For convenience, the compositions, hereinafter shown in cationic mol percent, recite the percentages of the fluorine and of the oxide of the respective metal separately. On this basis the maximum amount of fluorine should not exceed about 1.5%.

To further illustrate the invention, compositions containing $BaTiO_3$ as the ferroelectric compound, $SiO_2$ as the glass-forming oxide and $AlO_{1.5}$ within the abovementioned ranges, which may be utilized in carrying out the invention, are shown in Table I in cationic mol percent on the oxide basis as calculated from their batches, together with the time (hours) and temperature (° C.) of heat treatment and the dielectric constant (K) and the loss tangent (L.T.) in percent of the resulting ceramic body measured at 25° C.

*Table I*

|  | 1 | 2 | 3 | 4 | 5 | 6 | 7 | 8 |
|---|---|---|---|---|---|---|---|---|
| BaO | 44.3 | 31.2 | 35.7 | 37.8 | 33.4 | 36.6 | 36.4 | 36.1 |
| $TiO_2$ | 22.5 | 23.0 | 28.2 | 32.3 | 19.7 | 35.0 | 35.2 | 36.1 |
| $SiO_2$ | 15.6 | 21.4 | 16.5 | 14.9 | 21.7 | 13.2 | 9.9 | 16.7 |
| $AlO_{1.5}$ | 16.2 | 23.3 | 17.2 | 13.7 | 23.7 | 13.9 | 17.2 | 9.8 |
| $F_2$ | 0.6 | 0.5 | 1.3 | 0.5 | 0.6 | 0.5 | 0.6 | 0.6 |
| CaO | 1.4 | 1.1 | 2.4 | 1.3 | 1.5 | 1.3 | 1.3 | 1.3 |
| Excess BaO, percent | 97.0 | 35.6 | 26.6 | 17.0 | 69.6 | 4.6 | 3.4 | ------ |
| Hours | 2 | 2 | 3 | 3 | 2 | 2 | 2 | 2.5 |
| ° C | 1,000 | 1,000 | 925 | 925 | 925 | 1,000 | 1,075 | 915 |
| K | 240 | 260 | 820 | 1,370 | 300 | 860 | 840 | 650 |
| L.T. | 1.5 | 2.8 | 3.1 | 2.8 | 3.2 | 3.1 | 2.9 | 2.4 |

Table 1.—Continued

|  | 9 | 10 | 11 | 12 | 13 | 14 | 15 | 16 |
|---|---|---|---|---|---|---|---|---|
| BaO | 36.1 | 36.7 | 36.7 | 36.8 | 36.9 | 37.9 | 35.2 | 33.7 |
| $TiO_2$ | 31.8 | 32.4 | 32.4 | 32.5 | 32.5 | 32.0 | 37.4 | 36.9 |
| $SiO_2$ | 14.8 | 14.2 | 14.2 | 14.2 | 14.1 | 14.3 | 16.4 | 8.0 |
| $AlO_{1.5}$ | 17.3 | 15.4 | 15.4 | 15.6 | 15.6 | 15.8 | 9.8 | 18.4 |
| $F_2$ |  | 0.6 | 0.6 | 0.6 | 0.5 | 0.7 | 1.2 | 1.2 |
| CaO |  | 1.3 |  |  |  |  | 1.2 | 3.0 |
| MgO |  |  | 1.3 |  |  |  |  |  |
| ZnO |  |  |  | 0.9 |  |  |  |  |
| SrO |  |  |  |  | 0.9 |  |  |  |
| Excess BaO, percent | 13.5 | 13.3 | 13.3 | 13.3 | 13.5 | 18.4 |  |  |
| Excess $TiO_2$, percent |  |  |  |  |  |  | 6.3 | 9.5 |
| Hours |  | 2 | 2 | 3 | 2 | 2 | 3 | 2 | 2 |
| ° C | 1,075 | 1,075 | 1,000 | 1,075 | 1,075 | 925 | 950 | 950 |
| K | 800 | 1,340 | 1,370 | 1,220 | 1,320 | 1,350 | 500 | 1,300 |
| L.T. | 3.6 | 3.0 | 2.9 | 3.2 | 2.5 | 2.8 | 2.2 | 1.2 |

The compositions of this invention are preferably melted for 1 to 8 hours or more at 1400° C. or higher, as may be necessary, to produce homogeneous melts in crucibles, pots or tanks depending upon the size of the melt. Since the viscosities of the resulting glasses generally are relatively low (on the order of 1 poise above 1400° C.) fining of the melts presents no problem and the use of fining agents in the batches is unnecessary. Melting preferably should be carried out under neutral or oxidizing conditions. Barium nitrate or other nitrate may be used, if desired, as an oxidizing agent. The use of reducing agents tends to depreciate the dielectric properties. $BaCO_3$ is preferable as the source of BaO and has the advantage that the evolved $CO_2$ maintains an equilibrium with its dissociation products (CO and O) which tends to stabilize the state of oxidation of the melt.

Insofar as we are aware, the present glasses and useful articles composed thereof have never before been made because such compositions crystallize spontaneously unless, as we have found, the proper composition is used and they are cooled from a temperature above the liquidus to about 700° C. or below within a few seconds, say about 2–10 seconds. The rapidity of cooling limits, to some extent, the thickness of articles which can be produced from the molten state, but we have found it possible to press slabs up to about ½″ in thickness which cool as glass and are amenable to the subsequent heat treatment process. We have found that in the molten state their viscosity is so low, on the order of 1 to 10 poises at 1350°–1400° C., that they are particularly well adapted for centrifugal casting or for making thin sheet glass by rolling. Such thin glass sheets are particularly suitable for the dielectric laminations of capacitors, such as is shown in FIG. 6, for which purpose the thin glass sheets may, in known manner, be interleaved with metal foil strips or filmed with an electrically conducting coating before being laminated. The glass laminations are then sealed together by being heated to about 700° C. under pressure to enclose the metal laminations as described in United States Patent No. 2,405,529 and the glass is thereafter converted to a semicrystalline state by the above described heat treatment.

Articles of substantial thickness also can be made of the new glass by quenching it from the molten state, as by pouring it on a cold metal plate or into a cooling liquid or dropping it to form shot, then pulverizing it and molding the powdered glass, as by the method described in United States Patent No. 2,390,354. Since, as we have found, the glass can be heated to its softening point temperature without being crystallized, the shaped article is heated at such temperature to sinter it to a massive body. By the above described heat treatment the shaped glass article can then be converted to a semicrystalline body having the desired dielectric properties.

In Table I, the base compositions of Examples 4, and 9 to 14 inclusive, are similar to each other and vary principally in their fluorine contents, composition 9 being free of fluorine and compositions 4, and 10 to 14 containing various metal fluorides. It will be seen that the introduction of fluorine into the glass causes a substantial increase in the dielectric constant values and a small decrease in the loss tangent. The variation of the dielectric constant at room temperature with the particular metal fluoride which is added, however, is small and not critical.

Figure 1:
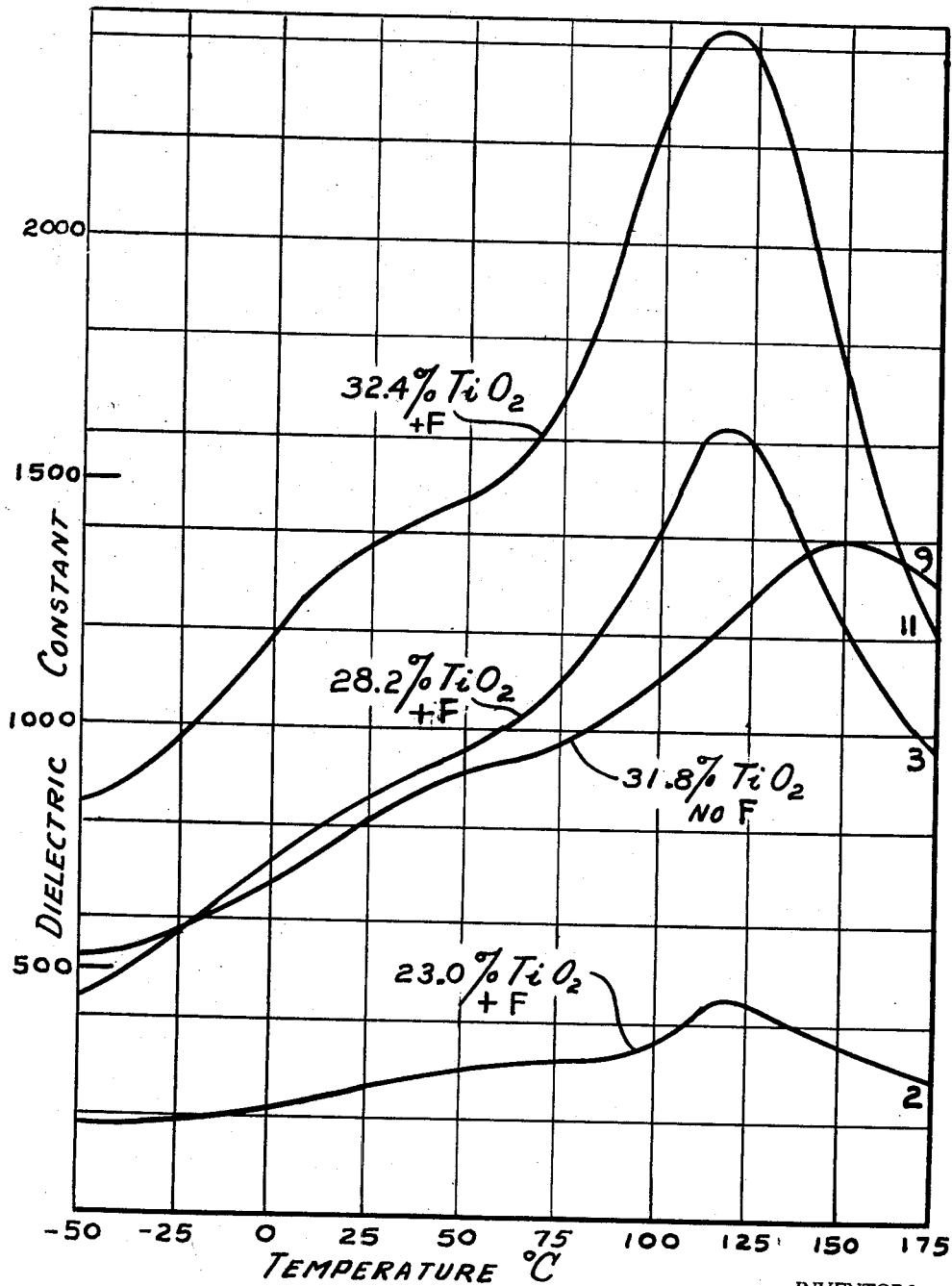
FIG. 1 is a graphical representation showing the relation between temperature in ° C. and the dielectric constant (K) of semicrystalline bodies made in accordance with the invention illustrating the effect of fluorine when present in compositions containing $BaTiO_3$, $SiO_2$ and $Al_2O_3$.

The curves of FIG. 1 illustrate generally the effect of variation of the $TiO_2$ content in compositions containing an excess of BaO, and also the effect of the presence or absence of fluorine, on the dielectric constant versus temperature curve, of semicrystalline bodies of the above described compositions made by the method of the invention. Examples 2, 3, and 11 of Table I, containing fluorine and 23.0, 28.2, and 32.4 cationic mol percent of $TiO_2$ respectively, are represented by curves 2, 3 and 11, while Example 9, which contains 31.8 cationic mol percent of $TiO_2$ but no fluorine, is represented by curve 9. Small variations in heat treatment and/or the $$SiO_2/Al_2O_3$$

ratio, $BaO/TiO_2$ ratio, the fluorine content have insignificant influence on the curves. The Curie point, indicated by the maximum value of K, at about 120° C. is to be seen in each of curves 2, 3, and 11 and this is in agreement with known data on $BaTiO_3$ per se. A large difference in dielectric constant and Curie point is exhibited by curve 9 as compared to curve 11 which indicates that fluorine, when present, promotes the formation of $BaTiO_3$ during the heat treatment of the present glass compositions.

Compositions 15 and 16 of Table I contain an excess of $TiO_2$.

In composition 14 the fluorine was introduced as $BaF_2$ of which the barium as BaO is included in the total BaO.

Figure 2:
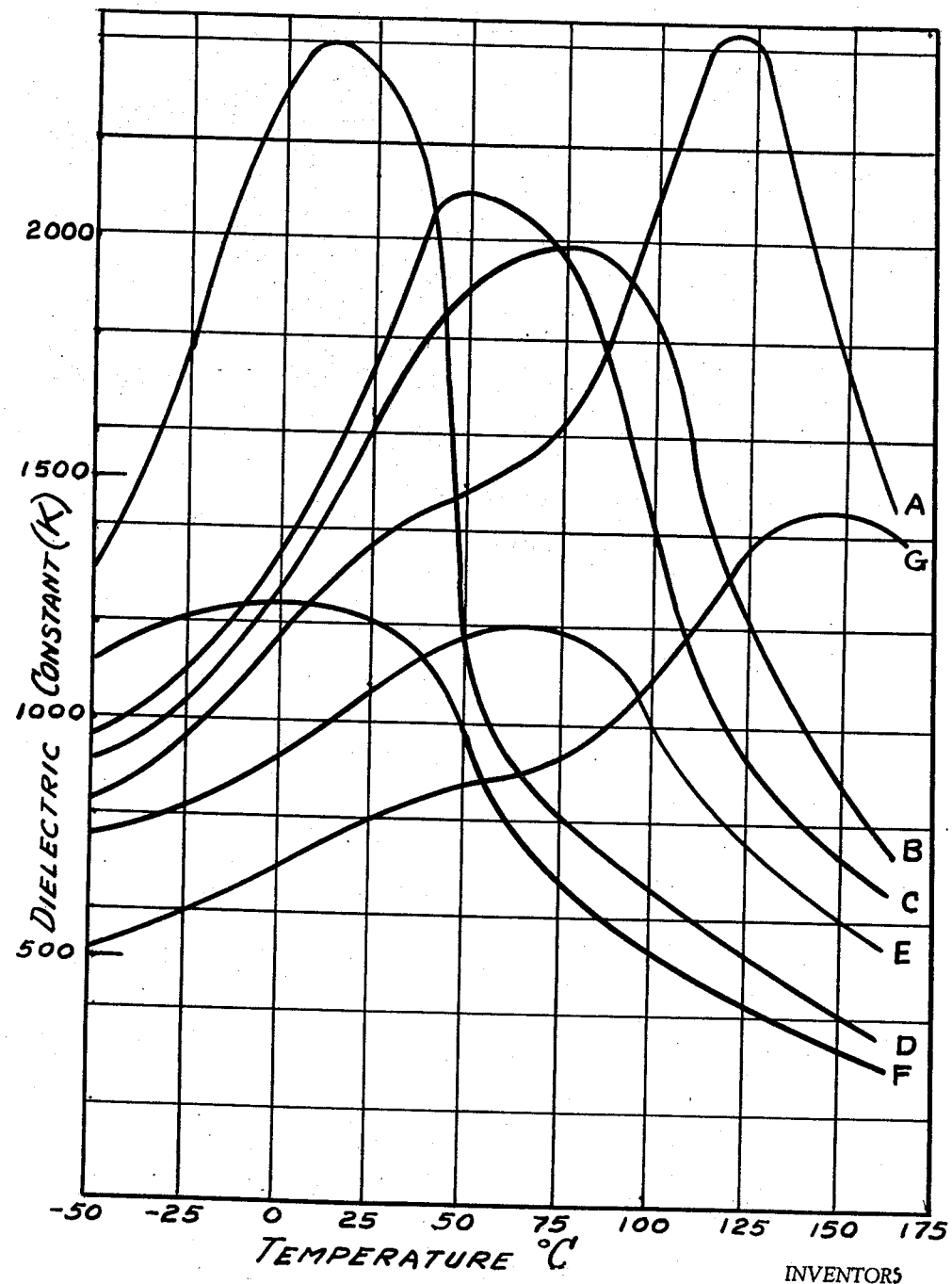
FIG. 2 is a graphical representation similar to that of FIG. 1 but illustrating the effect of an additional stable oxide when present in the compositions. As used herein, the term "stable oxide" means an oxide of a metal or of a metalloid which can be combined in the molten glass composition of the invention and retained therein without substantial loss by decomposition and/or volatilization.

In FIG. 2 are shown the types of curves representing the effect on dielectric constant versus temperature caused by addition of stable oxides to a semicrystalline body having the composition of Example 11 of Table I. Similar effects are produced by the same oxides when added to the other compositions of Table I. The amount of such oxides should not exceed about 10 cationic mol percent and preferably should not exceed 4 cationic mol percent, either individually or collectively. Specifically, curve A represents the composition of Example 11 per se and curves B, C, D, E and F represent in comparison the same composition additionally containing such stable oxides as are recited by way of example in Table II in which are shown: The amount of the respective glass forming oxide in cationic mol percent added to composition 11; the corresponding dielectric constant (K) at 25° C.; loss tangent (L.T.) at 25° C.; Curie point (C.P.) in ° C.; dielectric constant (K) at the Curie point; type of curve, A, B, C, D, E or F classified according to Curie point; and the optimum amount of the added oxide, where determined, designated "best" in the last column. K and L.T. were measured at a frequency of 1 kilocycle.

Table II

| Cationic mol percent of oxide added | K 25° C. | L.T. percent 25° C. | C.P., °C. | K at C.P. | Curve type | Remarks |
|---|---|---|---|---|---|---|
| 1.2 KO.5 | 1,100 | 2.5 | 120 | 1,400 | A | |
| 3.6 LiO.5 | 1,100 | 2.5 | 120 | 1,400 | A | |
| 2.2 BeO | 1,200 | 3.0 | 110 | 1,900 | A | |
| 1.3 MgO | 1,700 | 3.0 | 50 | 1,900 | C | Best. |
| 2.9 CaO | 850 | 3.1 | 120 | 1,770 | A | |
| 1.6 SrO | 1,150 | 2.5 | 100 | 2,050 | A-B | |
| 2.7 ZnO | 2,350 | 0.5 | 15 | 2,450 | D | Do. |
| 1.3 CdO | 1,500 | 3.1 | 105 | 2,280 | A-B | |
| 0.8 GaO$_{1.5}$ | 1,230 | 3.0 | 120 | 2,250 | A | |
| 1.2 InO$_{1.5}$ | 1,520 | 2.7 | 80 | 1,720 | B | |
| 0.2 TlO$_{1.5}$ | 1,100 | 2.9 | 120 | 1,850 | A | |
| 1.0 YO$_{1.5}$ | 1,140 | 3.3 | 120 | 2,100 | A | |
| 1.2 LAO$_{1.5}$ | 1,420 | 3.3 | 105 | 2,300 | A-B | |
| 0.9 CeO$_2$ | 1,340 | 3.0 | 90 | 1,900 | B | |
| 1.3 ZrO$_2$ | 1,400 | 2.8 | 80 | 1,600 | B | |
| 1.0 GeO$_2$ | 1,250 | 2.9 | 110 | 2,200 | A | |
| 1.3 SnO$_2$ | 1,700 | 2.8 | 50 | 2,100 | C | Do. |
| 1.4 SbO$_{1.5}$ | 900 | 2.7 | 90 | 1,350 | B | |
| 0.8 BiO$_{1.5}$ | 780 | 3.4 | 150 | 1,500 | G | |
| 1.8 VO$_{2.5}$ | 800 | 2.9 | 120 | 1,300 | A | |
| 1.2 NbO$_{2.5}$ | 1,500 | 2.1 | 80 | 2,100 | B | |
| 0.4 TaO$_{2.5}$ | 1,250 | 2.8 | 120 | 1,860 | A | |
| 0.8 CrO$_{1.5}$ | 820 | 2.8 | 105 | 1,900 | A-B | Do. |
| 0.4 MoO$_3$ | 1,250 | 2.8 | 120 | 2,000 | A | |
| 0.2 WO$_3$ | 1,150 | 3.0 | 120 | 2,100 | A | |
| 1.0 TeO$_2$ | 950 | 4.0 | 120 | 1,350 | A | |
| 0.4 UO$_2$ | 1,050 | 2.5 | 105 | 1,600 | A-B | |
| 1.0 MnO$_{1.5}$ | 1,050 | 0.6 | 65 | 1,200 | E | Do. |
| 0.6 FeO$_{1.5}$ | 1,500 | 3.3 | 80 | 2,100 | B | Do. |
| 0.7 CoO | 1,600 | 2.2 | 50 | 1,750 | C | Do. |
| 1.1 NiO | 1,200 | 0.6 | 0 | 1,230 | F | Do. |
| 0.7 PbO | 1,100 | 3.0 | 120 | 1,950 | A | |
| 0.4 CuO | 1,300 | 2.5 | 100 | 2,350 | A-B | Do. |

In some cases, variations in the Curie point by the various added oxides amount to no more than 20° C. and the percentage of the added oxide is not critical. Some of the added oxides, such as the oxides of Ca, B, Ga, P, As, Tl, Y, Ge, In, Ce, Zr, Sb, Nb, Fe, Cd, La, Sn, Zn, Bi, and Pb, improve the glass forming characteristics of the compositions and lower the temperature coefficient of dielectric constant of their final products and, therefore, larger amounts, up to 10% of such oxides may be added with advantage.

The addition of oxides of In, Ce, Zr, Sb, Nb, or Fe will lower the Curie point to about 80° C. as shown in Curve B of FIG. 2 which is characteristic of compositions containing these oxides.

A curve generally intermediate of Curves A and B, but not shown in FIG. 2, is produced by the addition of oxides of Sr, Cd, La, Cr, or Cu.

Curve C illustrates the effect of the addition of oxides of Mg, Sn or Co, which lower the Curie point to the neighborhood of 50° C.

As is shown in Curve D, the addition of ZnO produces Curie points in the neighborhood of room temperature and also lowers the loss tangent substantially.

A low loss tangent is also produced by the addition of oxides of Mn as shown in Curve E and by the addition of an oxide of Ni as shown in Curve F.

The addition of an oxide of Bi, as indicated in Table II, raises the Curie point, as shown in Curve G.

The temperatures at which the glasses hereinbefore and hereinafter disclosed must be heated in order to convert them into ferroelectric semicrystalline ceramic bodies vary with composition, being generally lower for compositions containing the glass-forming oxide $B_2O_3$ or mixtures of $B_2O_3$ and $SiO_2$ or $P_2O_5$. The proper heat treating temperature will vary also with the proportion of the ferroelectric crystalline phase desired, being higher the larger the desired amount of the ferroelectric phase or phases. It is, therefore, impossible to state a temperature or range of temperatures in degrees which is suitable and effective for all compositions. However, by means of the well known procedure called "Differential Thermal Analysis" or "DTA" (described in the book entitled "Differential Thermal Analysis: Theory and Practice" by W. J. Smothers, 1958) the approximate annealing and softening points and heat treatment temperature for any particular glass can readily be determined.

In such procedure the temperature of a small capsule containing a pulverized sample of the glass to be heat treated is slowly raised and by means of a thermocouple inserted in the powdered glass and having its E.M.F. opposed to that of a similar thermocouple inserted in an inert powder, such as $Al_2O_3$, and similarly heated, together with an automatic temperature recorder, any endothermal and exothermal reactions occurring within the glass as its temperature increases are indicated on a continuous graph, the abscissa of which indicates increasing temperature. As long as there is no such reaction in the glass the differential is zero and the curve is a substantially straight horizontal line. When the annealing point of the glass is reached, the beginning of a dip in the curve appears, showing the beginning of an absorption of heat. The temperature at the bottom of such dip is the softening point of the glass. This dip occurs in the range from about 500° C. to about 700° C. for the present glasses. As the temperature is further increased and the endothermal reaction is completed, the curve returns to the horizontal and, at about 50°–150° C. above said annealing point, an exothermal reaction occurs which produces a sudden pronounced peak in the curve and which, according to X-ray diffraction data, indicates the crystallization of the ferroelectric compound as the primary crystalline phase. The separation of other crystallizable phases, if any, is also indicated by their respective peaks following the first peak. Several hundred degrees above the temperature of the first peak there occurs a dip in the curve which represents the first melting of the crystalline phases. The useful range of heat treatment temperatures for the glasses of this invention in general lies between the temperature of the first DTA peak or crystallization of the ferroelectric crystalline phase and a temperature about 50° C. below the bottom of the first melting dip. The time required for such heat treatments ranges from at least one hour at the peak temperature of crystallization of the ferroelectric phase to at least ½ minute at about 50° C. below the bottom of the first melting dip of the DTA curve of the corresponding glass.

FIG. 3 represents the DTA curve for composition 4 of Table I and is typical of compositions comprising BaO, $TiO_2$, $SiO_2$ and $Al_2O_3$. From the curve it will be noted that the glass of composition 4 has an annealing point at about 670° C., the ferroelectric crystalline phase crystallizes at about 820° C., and the first melting occurs at about 1280° C. We have found that the broad overall range of temperatures which are suitable for the heat treatment of such glasses, and for any one of the glasses in general disclosed herein, extends from peak temperature of crystallization of the ferroelectric crystal phase to a temperature about 50° C. below the first melting dip as shown by the DTA curve of the respective glass; and that the optimum temperature in such range is midway between the peak of the ferroelectric crystal phase and the nadir of the first melting dip in the curve. For composition 4 it will be seen that such temperature range is about 820°–1230° C. and the optimum for obtaining highest K value is about 1050° C. For illustration, the approximate values of the annealing point, ferroelectric crystal phase, peak temperature and first melting dip of each of compositions 1–14 of Table I are set forth in ° C. in Table III.

Table III

| Glass No. | Ann. (° C.) pt. | Ferroelectric cryst. (° C.) phase | First (° C.) melting |
|---|---|---|---|
| 1 | 690 | 880 | 1,270 |
| 2 | 680 | 860 | 1,280 |
| 3 | 680 | 850 | 1,280 |
| 4 | 670 | 820 | 1,280 |
| 5 | 670 | 820 | 1,260 |
| 6 | 680 | 830 | 1,260 |
| 7 | 680 | 840 | 1,280 |
| 8 | 670 | 830 | 1,260 |
| 9 | 660 | 800 | 1,270 |
| 10 | 670 | 830 | 1,280 |
| 11 | 670 | 820 | 1,270 |
| 12 | 660 | 800 | 1,270 |
| 13 | 660 | 820 | 1,280 |
| 14 | 660 | 790 | 1,270 |

While compositions containing at least one ferroelectric compound, preferably $BaTiO_3$, together with at least one glass forming oxide, preferably $SiO_2$, and an additional oxide, preferably $Al_2O_3$, are hereinbefore shown in the preferred compositions of Table I, we have found that compositions consisting of at least one ferroelectric compound and at least one glass-forming oxide make good glasses which can be heat treated to produce desirable semicrystalline bodies in accordance with the invention. Such compositions are shown by way of example in Table IV in cationic mol percent together with the respective values for K and L.T. percent for the semicrystalline products resulting therefrom.

Table IV

|  | 17 | 18 | 19 | 20 | 21 | 22 | 23 | 24 |
|---|---|---|---|---|---|---|---|---|
| BaO | 31.5 | 34.2 | 32.2 | 34.2 | 40.0 | 36.5 | 31.6 | 33.8 |
| $TiO_2$ | 56.3 | 44.7 | 32.2 | 40.9 | 33.3 | 36.5 | 31.6 | 33.8 |
| $SiO_2$ | 12.2 |  | 11.9 | 3.8 | 13.4 | 8.3 |  |  |
| $BO_{1.5}$ |  | 21.1 | 23.7 | 21.1 |  |  | 18.4 | 15.2 |
| $PO_{2.5}$ |  |  |  |  | 13.3 | 18.7 | 18.4 | 17.2 |
| Excess BaO, percent |  |  |  |  | 20.1 |  |  |  |
| Excess $TiO_2$, percent | 78.8 | 30.7 |  | 19.5 |  |  |  |  |
| K | 42 | 47 | 40 | 68 | 35 | 45 | 115 | 63 |
| L.T., percent | <1 | 0.8 | 8.0 | 1.0 | <1 | <1 | <1 | 5.0 |

In compositions 17, 18 and 20 of Table IV the respective amounts of $TiO_2$ are 78.8%, 30.7% and 19.5% in excess of the 1/1 respective stoichiometric amounts of BaO, which fact accounts for the meltability and favorable glass forming characteristics of these glasses. Compositions 19–24 are examples of glasses which individually contain two of the three glass-forming oxides $SiO_2$, $B_2O_3$ and $P_2O_5$. The resulting increased contents of glass forming oxide contributes to their glass forming characteristics. Compositions 19, 22, 23 and 24 contain stoichiometric amounts of BaO and $TiO_2$.

The compositions of Table II individually contain the oxide components of $BaTiO_3$ together with $SiO_2$, $Al_2O_3$ and an oxide selected from the stable oxides of a variety of elements. Such glass compositions produce semicrystalline bodies having useful and desirable dielectric properties. We also have found that a great many glass compositions which form useful semicrystalline products, when heat treated in accordance with the invention, can be made by introducing such stable oxides into compositions consisting of the oxide components $BaTiO_3$ and a glass forming oxide. Examples of such compositions consisting of the oxide components of $BaTiO_3$, and also one of the glass forming oxides, $SiO_2$, $Al_2O_3$, $B_2O_3$ and $P_2O_5$, and the added stable oxides are shown in Table V in cationic mol percent together with their respective value of K and L.T. The compositions of Table V all result in glasses when their melts are cooled rapidly. Some of these compositions contain stoichiometric amounts of BaO and $TiO_2$ and the cationic mol percentages in such cases are equal. When either BaO or $TiO_2$ is in excess of the stoichiometric amount, as will appear from the respective percentages given, the percentage of such excess may be calculated by the usual procedure, if desired. Compositions in which the glass forming oxide is $B_2O_3$ were heat treated for 2.5 hours at about 850° C. All other compositions of Table V were heat treated for 2.5 hours at about 1000° C.

Table V

|  | 25 | 26 | 27 | 28 | 29 | 30 | 31 | 32 |
|---|---|---|---|---|---|---|---|---|
| BaO | 31.8 | 28.4 | 30.4 | 35.2 | 31.8 | 35.2 | 31.8 | 33.6 |
| $TiO_2$ | 38.1 | 34.0 | 30.4 | 42.2 | 31.8 | 42.2 | 31.8 | 28.1 |
| $SiO_2$ | 18.0 |  |  | 12.7 |  | 12.7 |  |  |
| $BO_{1.5}$ |  | 27.8 |  |  | 29.1 |  | 29.1 | 29.2 |
| $PO_{2.5}$ |  |  | 31.3 |  |  |  |  |  |
| CuO | 12.1 | 9.8 | 7.9 |  |  |  |  |  |
| BeO |  |  |  | 9.9 | 7.3 |  |  |  |
| MgO |  |  |  |  |  | 9.9 | 7.3 |  |
| CaO |  |  |  |  |  |  |  | 9.1 |
| K | 34 | 68 | 37 | 54 | 46 | 75 | 40 | 420 |
| L.T., percent | <1 | 5.0 | <1 | <1 | <1 | <1 | <1 | 2.5 |

|  | 33 | 34 | 35 | 36 | 37 | 38 | 39 | 40 |
|---|---|---|---|---|---|---|---|---|
| BaO | 32.9 | 28.1 | 33.6 | 31.8 | 30.4 | 32.7 | 29.3 | 28.1 |
| $TiO_2$ | 26.6 | 28.1 | 28.1 | 31.8 | 30.4 | 32.7 | 29.3 | 28.1 |
| $SiO_2$ |  |  |  |  |  | 17.3 |  |  |
| $BO_{1.5}$ | 31.7 |  | 29.2 | 29.1 |  |  | 27.6 |  |
| $PO_{2.5}$ |  | 29.2 |  |  | 31.3 |  |  | 29.2 |
| CaO | 8.8 | 14.6 |  |  |  |  |  |  |
| ZnO |  |  | 9.1 |  |  |  |  |  |
| SrO |  |  |  | 7.3 | 7.9 |  |  |  |
| CdO |  |  |  |  |  | 17.3 | 13.8 | 14.6 |
| K |  | 63 | 79 | 540 | 32 | 250 | 200 | 55 |
| L.T., percent |  | 1.5 | 1 | 1 | 1 | 1 | 2.5 | 1.3 |

|  | 41 | 42 | 43 | 44 | 45 | 46 | 47 | 48 |
|---|---|---|---|---|---|---|---|---|
| BaO | 26.0 | 40.0 | 31.6 | 31.5 | 34.2 | 32.5 | 31.5 | 34.8 |
| $TiO_2$ | 31.2 | 33.3 | 31.6 | 37.8 | 40.8 | 38.9 | 37.8 | 34.8 |
| $SiO_2$ |  | 13.4 |  | 12.2 |  |  | 12.2 |  |
| $BO_{1.5}$ | 16.2 |  | 18.4 |  | 21.1 | 20.3 |  | 20.3 |
| $YO_{1.5}$ | 26.6 |  |  |  |  |  |  |  |
| $AlO_{1.5}$ |  | 13.3 | 18.4 |  |  |  |  |  |
| $ZrO_2$ |  |  |  | 18.5 | 3.9 |  |  |  |
| $ThO_2$ |  |  |  |  |  | 8.3 |  |  |
| $GeO_2$ |  |  |  |  |  |  | 18.5 | 10.1 |
| K | 32 | 560 | 126 | 63 | 74 | 106 | 40 | 66 |
| L.T., percent | <1 | 1.7 | 1.7 | 1.1 | 0.9 | 2.5 | <1 | 0.9 |

Table V.—Continued

| | 49 | 50 | 51 | 52 | 53 | 54 | 55 | 56 |
|---|---|---|---|---|---|---|---|---|
| BaO | 34.8 | 34.2 | 40.0 | 31.6 | 32.1 | 33.8 | 32.9 | 27.6 |
| TiO$_2$ | 34.8 | 40.8 | 33.2 | 31.6 | 32.1 | 33.8 | 39.4 | 33.1 |
| SiO$_2$ | | | 12.6 | | 11.9 | | | |
| BO$_{1.5}$ | 20.3 | 21.1 | | 18.4 | | | 20.3 | |
| PO$_{2.5}$ | | | | | | 17.2 | | 15.1 |
| SnO$_2$ | 10.1 | | | | | | | |
| PBO | | 3.9 | | | | | | |
| VO$_{2.5}$ | | | 13.2 | 18.4 | | | | |
| NbO$_{2.5}$ | | | | | 23.9 | 15.2 | | |
| TaO$_{2.5}$ | | | | | | | 7.4 | 24.2 |
| K | 210 | 230 | 21 | 43 | 80 | 52 | 43 | 130 |
| L.T., percent | 3.6 | <1 | | <1 | <1 | <1 | <1 | 3.0 |

| | 57 | 58 | 59 | 60 | 61 | 62 | 63 | 64 |
|---|---|---|---|---|---|---|---|---|
| BaO | 31.6 | 24.5 | 32.9 | 34.2 | 31.5 | 34.8 | 31.5 | 34.2 |
| TiO$_2$ | 31.6 | 24.5 | 39.4 | 40.8 | 37.8 | 34.8 | 37.8 | 40.8 |
| SiO$_2$ | | | | | 12.2 | | 12.2 | |
| BO$_{1.5}$ | 18.4 | | 20.3 | 21.1 | | 20.3 | | 21.1 |
| PO$_{2.5}$ | | 25.5 | | | | | | |
| SbO$_{1.5}$ | 18.4 | 25.5 | | | | | | |
| BiO$_{1.5}$ | | | 7.4 | | | | | |
| MoO$_3$ | | | | 3.9 | | | | |
| WO$_3$ | | | | | 18.5 | 10.1 | | |
| TeO$_2$ | | | | | | | 18.5 | 3.9 |
| K | 105 | 55 | 250 | 65 | 68 | 250 | 26 | 170 |
| L.T., percent | <1 | 1.5 | <1 | <1 | <1 | <1 | | <1 |

| | 65 | 66 | 67 | 68 | 69 | 70 | 71 | 72 | 73 | 74 |
|---|---|---|---|---|---|---|---|---|---|---|
| BaO | 39.9 | 30.0 | 28.1 | 32.0 | 34.7 | 35.2 | 30.4 | 35.2 | 36.6 | 27.0 |
| TiO$_2$ | 39.9 | 36.0 | 28.1 | 38.4 | 34.7 | 42.2 | 30.4 | 42.2 | 36.6 | 32.6 |
| SiO$_2$ | 13.4 | | | 11.6 | | 12.7 | | 12.7 | | |
| BO$_{1.5}$ | | 18.7 | | | 20.4 | | | | 21.4 | |
| PO$_{2.5}$ | | | 29.1 | | | | 31.3 | | | 30.1 |
| UO$_2$ | 6.8 | | | | | | | | | |
| MnO$_{1.5}$ | | 15.3 | 14.7 | | | | | | | |
| FeO$_{1.5}$ | | | | 18.0 | 10.2 | | | | | |
| NiO | | | | | | 9.9 | 7.9 | | | |
| CoO | | | | | | | | 9.9 | 5.4 | 10.3 |
| K | 68 | 28 | 33 | 65 | 42 | 28 | 23 | 52 | 52 | 33 |
| L.T., percent | <1 | <1 | <1 | <1 | <1 | <1 | <1 | <1 | <1 | <1 |

FIG. 4 represents the DTA curve for composition 33 of Table V which contains the oxide components of BaTiO$_3$ and the glass forming oxide B$_2$O$_3$. The temperatures of the respective dips and peaks of this curve are generally lower than the corresponding temperatures of the DTA curve of FIG. 3. From the curve it will be noted that glass composition 33 has approximately an annealing point at about 530° C., a ferroelectric crystalline phase formed at about 660° C., and a first melting dip at about 970° C. The overall range of temperatures which are suitable for the heat treatment of this glass is 660°–920° C. with an optimum at about 790° C.

The compositions of Table VI, shown in cationic mol percent, contain the oxide components of a variety of ferroelectric compounds including one or more of: titanate of barium or cadmium; niobate of sodium or potassium or strontium or cadmium or barium or lead; zirconate of cadmium or barium or lead; tantalate of sodium or cadmium; ferrate of lead or lanthanum; germanate of iron; or oxide of tungsten, WO$_3$. Each of the glasses of Table VI, after being heat treated, will contain one or more of such high permittivity (designated Hi Perm) crystal phases; the most probable phases are indicated for the respective compositions. It is to be understood, however, that while it is possible that the semicrystalline product of each composition may contain all of the high permittivity crystalline phases or solid solutions thereof indicated therefor, we have not as yet succeeded in identifying all of them therein. On the other hand, the high dielectric constants give a clear indication of the presence of one or more of the ferroelectric phases shown in the table. The materials in the finished semicrystalline state generally exhibit hysteresis effects characteristic for ferroelectric materials.

Table VI

| | 75 | 76 | 77 | 78 | 79 |
|---|---|---|---|---|---|
| NbO$_{2.5}$ | 42.7 | 45.0 | 40.3 | 41.3 | 45.8 |
| NaO$_{.5}$ | 28.3 | 29.7 | 27.0 | 27.6 | 14.9 |
| CdO | 7.1 | 7.4 | 6.8 | 6.9 | 7.2 |
| BaO | | | 7.3 | | |
| TiO$_2$ | | | | 6.6 | 13.7 |
| KO$_{.5}$ | | | | | 18.4 |
| SiO$_2$ | 21.9 | 17.9 | 18.6 | 17.6 | |
| °C | 1,000 | 1,600 | 1,000 | 925 | 925 |
| K | 375 | 590 | 520 | 900 | 308 |
| L.T., percent | 2.4 | 2.1 | 1.6 | 1.5 | 2.6 |
| Hi Perm. crystal phases | NaNbO$_3$, Cd$_{.5}$NbO$_3$, CdNbO$_{3.5}$ | NaNbO$_3$, Cd$_{.5}$NbO$_3$, CdNbO$_{3.5}$ | NaNbO$_3$, Cd$_{.5}$NbO$_3$, Ba$_{.5}$NbO$_3$, CdNbO$_{3.5}$, BaNbO$_{3.5}$ | NaNbO$_3$, CdTiO$_3$, CdNbO$_{3.5}$ | NaNbO$_3$, KNbO$_3$, Cd$_{.5}$NbO$_3$, CdNbO$_{3.5}$ |

| | 80 | 81 | 82 | 83 | 84 |
|---|---|---|---|---|---|
| NbO$_{2.5}$ | 42.6 | 43.5 | 40.5 | 29.8 | |
| NaO$_{.5}$ | 28.2 | 26.6 | 29.6 | 33.8 | |
| CdO | 7.0 | 7.1 | 9.8 | 7.2 | |
| TaO$_{2.5}$ | 3.5 | | | | |
| ZrO$_2$ | | 4.5 | | | |
| WO$_3$ | | | 2.0 | 12.7 | 44.5 |
| SiO$_2$ | 18.7 | 18.3 | 18.1 | 16.5 | |
| BO$_{1.5}$ | | | | | 31.3 |
| PO$_{2.5}$ | | | | | 18.2 |
| °C | 1,000 | 1,000 | 850 | 775 | 900 |
| K | 1,138 | 520 | 645 | 90 | 2,100 |
| L.T., percent | 2.2 | 1.5 | 2.3 | 1.1 | 120 |
| Hi Perm. crystal phases | NaNbO$_3$, Cd$_{.5}$NbO$_3$, NaTaO$_3$, Cd$_{.5}$TaO$_3$ | NaNbO$_3$, Cd$_{.5}$NbO$_3$, CdZrO$_3$, NaZrO$_3$ | NaNbO$_3$, Cd$_{.5}$NbO$_3$, WO$_3$ | NaNbO$_3$, Cd$_{.5}$NbO$_3$, WO$_3$ | WO$_3$ |

Table VI.—Continued

|  | 85 | 86 | 87 | 88 | 89 |
|---|---|---|---|---|---|
| $NbO_{2.5}$ | | 34.0 | 45.1 | 39.6 | 18.3. |
| CdO | 10.5 | | | | |
| $ZrO_2$ | 30.0 | | | | |
| $NaO_{.5}$ | | | 22.6 | | |
| BaO | 10.3 | 11.1 | | 10.4 | |
| PbO | 23.8 | 12.5 | 11.3 | 10.2 | 36.2. |
| SrO | | 10.5 | | 8.8 | |
| $FeO_{1.5}$ | | | | | 18.3. |
| $AlO_{1.5}$ | 5.2 | 16.2 | | 2.3 | |
| $BO_{1.5}$ | | | | 11.6 | |
| $SiO_2$ | 20.2 | 15.7 | 21.0 | 17.1 | 27.2. |
| $F_2$ | 1.1 | 2.0 | | | |
| °C | 925 | 1,000 | 1,075 | 1,000 | 850. |
| K | 161 | 148 | 214 | 1,200 | 182. |
| L.T., percent | 1.0 | 0.1 | 1.4 | 3.7 | 3.0. |
| Hi perm. crystal phases | $BaZrO_3$ / $PbZrO_3$ / $CdZrO_3$ | $Ba_{.5}NbO_3$ / $Sr_{.5}NbO_3$ / $Pb_{.5}NbO_3$ / $BaNbO_{3.5}$ / $SrNbO_{3.5}$ / $PbNbO_{3.5}$ | $NaNbO_3$ / $Pb_{.5}NbO_3$ / $PbNbO_{3.5}$ | $Ba_{.5}NbO_3$ / $Sr_{.5}NbO_3$ / $Pb_{.5}NbO_3$ / $BaNbO_{3.5}$ / $SrNbO_{3.5}$ / $PbNbO_{3.5}$ | $Pb_{.5}NbO_3$. / $Pb_2NbFeO_6$. / $Pb_2Nb_2O_7$. / $PbNb_{.5}FeO_3$. |

|  | 90 | 91 | 92 | 93 |
|---|---|---|---|---|
| $NbO_{2.5}$ | 17.4 | 16.4 | | |
| $NaO_{.5}$ | 17.4 | 16.2 | | |
| BaO | 25.8 | 24.6 | | |
| $FeO_{1.5}$ | | | 29.3 | 33.6. |
| $AlO_{1.5}$ | 4.0 | 3.6 | | |
| $BO_{1.5}$ | | 5.4 | 25.9 | 13.8. |
| $SiO_2$ | 9.6 | 9.3 | 15.0 | 13.8. |
| $TiO_2$ | 25.8 | 24.5 | | |
| $LaO_{1.5}$ | | | 29.8 | 34.1. |
| $GeO_2$ | | | | 4.7. |
| °C | 1,000 | 850 | 900 | 850. |
| K | 401 | 165 | 1,468 | 11,500. |
| L.T., percent | 1.4 | 0.8 | 30 | 45. |
| Hi perm. crystal phases | $NaNbO_3$ / $BaTiO_3$ / $Ba_{.5}NbO_3$ / $BaNbO_{3.5}$ | $NaNbO_3$ / $BaTiO_3$ / $Ba_{.5}NbO_3$ / $BaNbO_{3.5}$ | $LaFeO_6$ | $LaFeO_6$. / $FeGeO_6$. |

FIG. 5 represents the DTA curve for composition 76 of Table VI which contains the oxide components of $NaNbO_3$ and $Cd_{.5}NbO_3$ and the glass forming oxide $SiO_2$. The relative positions of the peaks and dips of this curve are roughly similar to those of the DTA curve of FIG. 3. From the curve is will be noted that glass composition 76 has an annealing point at about 600° C., a ferro-electric crystalline phase at about 690° C. and a first melting dip at about 1170° C. The overall range of temperatures which are suitable for the heat treatment of this glass is 690°–1120° C. with an optimum at about 905° C. About 2 hours heat treatment is required to produce maximum crystallization at the optimum heat treating temperature.

It is to be noted that composition 90 of Table VI contains the constituent oxides of the ferroelectric compounds $BaTiO_3$ and $NaNbO_3$ in a total amount of 86.4 cationic mol percent. The compositions of this invention preferably should not contaain more than about 90% of the constituent oxides of ferroelectric compounds, since a small amount of a glassy phase or matrix is desirable to impart mechanical strength to the semicrystalline body. On the other hand composition 5 of Table I contains a calculated total of only 39.4 cationic mol percent of $BaTiO_3$ and has a $K=300$. Compositions having less than about 30 cationic mol percent of total constituent oxides of one or more ferroelectric compounds have relatively low K values although they still possess good insulation resistance and relatively high breakdown voltage.

In general the compositions of this invention are characterized by unusually high insulation resistance and breakdown voltages amounting to up to $10^{11}$ ohms at 400° C. (composition 11 of Table I) and up to $4 \times 10^5$ volts D.C. per cm. or $2 \times 10^5$ volts A.C. per cm. (an average of a great many compositions in the system $BaO$–$TiO_2$–$SiO_2$–$Al_2O_3$) respectively.

In the curves of FIG. 6, dielectric constant is represented as a function of temperature for the semicrystalline products of a number of the compositions of Table VI. The curves are designated by the numbers of the corresponding compositions and the temperatures at which the respective compositions were heat treated to convert them to the semicrystalline state in accordance with the invention are also indicated thereon. As can be seen from the curves, a variety of rates of change of capacitance with temperature can be obtained with different compositions.

In FIG. 7 is shown a capacitor in exaggerated size comprising a thin layer of a semicrystalline dielectric 10, made in accordance with the invention, a thin strip or film of metal or other electrically conducting or semiconducting material 11 in close contact with the opposite faces of the layer 10 and leads 12 of ribbon or wire in firm electrical contact with the opposite edges of the conducting strips 11. An outside layer of semicrystalline dielectric 13 surrounds and encloses the conducting strips 11 and dielectric layer 10 and is fusion-sealed to the leads 12. It will be understood that this novel construction is possible only by the method of assembly wherein the dielectric layer 10 and outer enclosure 13, at the time of assembly, are glass which is subsequently softened and joined to leads 12 after which the glass is converted to the semicrystalline state by heat treatment as described above. It will be obvious that such a capacitor so made is not limited to a single pair of conducting strips 11 but may comprise a plurality of alternate conducting strips with individual leads appropriately oriented, each of such strips being insulated and surrounded by the interposed dielectric layers and the outer dielectric enclosure joined to and forming a part of the dielectric layers. Thus, in capacitors in which there are several electrically conducting layers, two of said layers being connected respectively to input and output terminals, the remaining electrically conducting layers each may be connected to one of said terminals to produce a parallel, series, or combination of parallel and series capacitors.

We claim:

1. The method of making a semicrystalline ceramic body which comprises melting a composition comprising, on the oxide basis, 30–90 cationic mol percent of the constituents of BaTiO$_3$, and at least one glass-forming oxide selected from the class consisting of SiO$_2$, Al$_2$O$_3$, B$_2$O$_3$ and P$_2$O$_5$, cooling the melt to form a glass body and heat treating the glass body by heating it at a temperature between the peak temperature of crystallization of the BaTiO$_3$ and about 50° C. below the bottom of the first melting dip of the DTA curve of the glass for a time ranging from at least one hour at the lower of said temperatures to at least one-half minute at the higher of said temperatures to crystallize the BaTiO$_3$, and cooling the body.

2. The method of making a semicrystalline ceramic body in accordance with claim 1 wherein the glass-froming oxide is SiO$_2$.

3. The method of making a semicrystalline ceramic body in accordance with claim 1 wherein the glass-forming oxide is Al$_2$O$_3$.

4. The method of making a semicrystalline ceramic body in accordance with claim 1 wherein the glass-forming oxide is B$_2$O$_3$.

5. The method of making a semicrystalline ceramic body in accordance with claim 1 wherein the glass-forming oxide is P$_2$O$_5$.

6. The method of making a semicrystalline ceramic body which comprises melting a composition comprising, on the oxide basis, 30–90 cationic mol percent of BaTiO$_3$, SiO$_2$, and at least 3 cationic mol percent of a metal oxide selected from the group consisting of CuO, BeO, MgO, CdO, AlO$_{1.5}$, ZrO$_2$, GeO$_2$, VO$_{2.5}$, NbO$_{2.5}$, WO$_3$, TeO$_2$ and CoO, cooling the melt to form a glass body and heat treating the glass body by heating it at a temperature between the peak temperature of crystallization of the ferroelectric compound and about 50° C. below the bottom of the first melting dip of the DTA curve of the glass for a time ranging from at least one hour at the lower of said temperatures to at least one-half minute at the higher of said temperatures to crsytalilze the BaTiO$_3$, and cooling the body.

7. The method of making a semicrystalline ceramic body which comprises melting a composition consisting essentially of, on the oxide basis, 30–90 cationic mol percent of the constituents of BaTiO$_3$, 3–30 cationic mol percent of AlO$_{1.5}$, and SiO$_2$, cooling the melt to form a glass body and heat treating the glass body by heating it at a temperature between the peak temperature of crystallization of the ferroelectric compound and about 50° C. below the bottom of the first melting dip of the DTA curve of the glass for a time ranging from at least one hour at the lower of said temperatures to at least one-half minute at the higher of said temperatures to crystallize the BaTiO$_3$, and cooling the body.

8. The method of making a semicrystalline ceramic body which comprises melting a composition consisting essentially of, on the oxide basis, 30–90 cationic mol percent of the constituents of BaTiO$_3$, 3–30 cationic mol percent of AlO$_{1.5}$, up to 4 cationic mol percent of an oxide of a metal selected from the class consisting of Na, K, Be, Mg, Ca, Sr, Zn, Cd, Ga, In, Tl, Y, La, Ce, Zr, Ge, Sm, Sb, Bi, V, Nb, Ta, Cr, Mb, W, Te, U, Mn, Fe, Co, Ni, Pb, and Cu, and SiO$_2$, cooling the melt to form a glass body and heat treating the glass body by heating it at a temperature between the peak temperature of crystallization of the ferroelectric compound and about 50° C. below the bottom of the first melting dip of the DTA curve of the glass for a time ranging from at least one hour at the lower of said temperatures to at least one-half minute at the higher of said temperatures to crystallize the BaTiO$_3$, and cooling the body.

9. The method of making a semicrystalline ceramic body as defined in claim 7 in which the composition contains 0.5–1.5 cation mol percent of fluorine.

10. The method of making a semicrystalline ceramic body as defined in claim 4 in which the composition contains, in addition to the constituent oxides of BaTiO$_3$ and B$_2$O$_3$, at least 3 cation mol percent of a metal oxide selected from the class consisting of CuO, BeO, MgO, CaO, ZnO, SrO, CdO, AlO$_{1.5}$, YO$_{1.5}$, ZrO$_2$, ThO$_2$, CeO$_2$, SnO$_2$, PbO, VO$_{2.5}$, TaO$_{1.5}$, SbO$_{1.5}$, BiO$_{1.5}$, MoO$_3$, WO$_3$, TeO$_2$, MnO$_{1.5}$, FeO$_{1.5}$, NiO and CoO.

11. The method of making a semicrystalline ceramic body as defined in claim 5 in which the composition contains, in addition to the constituents of BaTiO$_3$ and P$_2$O$_5$, at least 3 cationic mol percent of a metal oxide selected from the class consisting of CuO, CaO, SrO, CdO, NbO$_{2.5}$ and TaO$_{2.5}$.

12. The method of making a semicrystalline ceramic body which comprises melting a composition comprising, on the oxide basis, 30–90 cationic mol percent of the constituents of a ferroelectric niobate selected from the class consisting of NaNbO$_3$, KNbO$_3$, Cd$_{.5}$NbO$_3$, Sr$_{.5}$NbO$_3$, Pb$_{.5}$NbO$_3$ and Ba$_{.5}$NbO$_3$, and at least one glass-forming oxide selected from the class consisting of SiO$_2$, Al$_2$O$_3$, B$_2$O$_3$ and P$_2$O$_5$, cooling the melt to form a glass body and heat-treating the glass body by heating it at a temperature between the peak temperature of crystallization of the niobate and about 50° C. below the bottom of the first melting dip of the DTA curve of the glass for a time ranging from at least one hour at the lower of said temperatures to at least one-half minute at the higher of said temperatures to crystallize the niobate, and cooling the body.

13. The method of making a semicrystalline ceramic body which comprises melting a composition comprising, on the oxide basis, 30–90 cationic mol percent of the constituents of a ferroelectric meta-niobate selected from the class consisting of CdNbO$_{3.5}$, SrNbO$_{3.5}$, BaNbO$_{3.5}$ and PbNbO$_{3.5}$, and at least one glass-forming oxide selected from the class consisting of SiO$_2$, Al$_2$O$_3$, B$_2$O$_3$ and P$_2$O$_5$, cooling the melt to form a glass body and heat-treating the glass body by heating it at a temperature between the peak temperature of crystallization of the meta-niobate and about 50° C. below the bottom of the first melting dip of the DTA curve of the glass for a time ranging from at least one hour below the said temperature to at least one-half minute at the higher of said temperatures to crystallize the meta-niobate and cooling the body.

14. The method of making a semicrystalline ceramic body which comprises melting a composition comprising, on the oxide basis, 30–90 cationic mol percent of the constituents of at least one ferroelectric zirconate selected from the class consisting of CdZrO$_3$, BaZrO$_3$ and PbZrO$_3$, and at least one glass-forming oxide selected from the class consisting of SiO$_2$, Al$_2$O$_3$, B$_2$O$_3$ and P$_2$O$_5$, cooling the melt to form a glass body and heat-treating the glass body by heating it at a temperature between the peak temperature of crystallization of the zirconate and about 50° C. below the bottom of the first melting dip of the DTA curve of the glass for a time ranging from at least one hour at the lower of said temperatures to at least one-half minute at the higher of said temperatures to crystallize the zirconate, and cooling the body.

15. The method of making a semicrystalline ceramic body which comprises melting a composition comprising, on the oxide basis, 30–90 cationic mol percent of tungstic oxide and at least one glass-forming oxide selected from the class consisting of SiO$_2$, Al$_2$O$_3$, B$_2$O$_3$ and P$_2$O$_5$, cooling the melt to form a glass body and heat-treating the glass body by heating it at a temperature between the peak temperature of crystallization of the tungstic oxide and about 50° C. below the bottom of the DTA curve of the glass for a time ranging from at least one hour at the lower of said temperatures to at least one-half minute at the higher of said temperature to crystallize the tungstic oxide, and cooling the body.

16. The method of making a semicrystalline ceramic body, which includes melting a composition, which, on the oxide basis in cationic mol percent, comprises 30–45% BaO, 15–40% TiO$_2$, the amount of BaO being 0–100% in excess of the 1/1 stoichiometric equivalent of BaTiO$_3$ based on the amount of TiO$_2$ present, 7–26% SiO$_2$, 3–30% AlO$_{1.5}$, the amount of AlO$_{1.5}$ not differing from the amount of $SiO_2$ by more than about ⅓ of the amount of $SiO_2$, and 0.5–1.5% F, the total BaO, $TiO_2$, $SiO_2$, $AlO_{1.5}$ and F being at least 90%, cooling it to form a glass body and heat-treating the body by heating it between 850° C. and 1150° C. for a time ranging from at least one hour at 850° C. to at least one-half minute at 1150° C. to crystallize the glass.

17. The method of making a semi-crystalline ceramic body which includes melting a composition, which, on the oxide basis in cationic mol percent, comprises 30–40% BaO, 15–40% $TiO_2$, the amount of BaO being 0–100% in excess of the 1/1 stoichiometric equivalent of $BaTiO_3$ based on the amount of $TiO_2$ present, said excess preferably being higher the lower amount of $TiO_2$, 9.5–26% $SiO_2$ and 7–25% $AlO_{1.5}$, the amount of $AlO_{1.5}$ not differing from the amount of $SiO_2$ by more than about ⅓ of the amount of $SiO_2$, the total BaO, $TiO_2$, $SiO_2$ and $AlO_{1.5}$ being at least 90%, cooling it to form a glass body and heat-treating the glass body by heating it between 850° and 1150° C. for a time ranging from at least one hour at 850° C. to at least one-half minute at 1150° C. to crystallize the glass.

18. A semicrystalline ceramic body comprising, on the oxide basis, 30–90 cationic mole percent of the constituents of $BaTiO_3$, at least 30 cationic mole percent of the said body comprising said $BaTiO_3$ as a crystalline phase uniformly dispersed in another phase, said crystalline phase being crystallized in situ in a homogeneous glass having the same oxide composition as the body and including at least one glass forming oxide selected from the class consisting of $SiO_2$, $Al_2O$, $B_2O_3$ and $P_2O_5$.

19. A semicrystalline ceramic body comprising, on the oxide basis, 30–90 cationic mole percent of the constituents of a niobate selected from the class consisting of $NaNbO_3$, $KNbO_3$, $Cd_{.5}NbO_3$, $Sr_{.5}NbO_3$, $Pb_{.5}NbO_3$ and $Ba_{.5}NbO_3$, at least 30 cationic mole percent of said body comprising at least one of said niobates as a crystalline phase uniformly dispersed in another phase, said crystalline phase being crystallized in situ in a homogeneous glass having the same oxide composition as the body and including at least one glass forming oxide selected from the class consisting of $SiO_2$, $Al_2O_3$, $B_2O_3$ and $P_2O_5$.

20. A semicrystalline ceramic body comprising, on the oxide basis, 30–90 cationic mole percent of the constituents of a meta-niobate selected from the class consisting of $CdNbO_{3.5}$, $SrNbO_{3.5}$, $BaNbO_{3.5}$ and $PbNbO_{3.5}$, at least 30 cationic mole percent of said body comprising at least one of said meta-niobates as a crystalline phase uniformly dispersed in another phase, said crystalline phase being crystallized in situ in a homogeneous glass having the same oxide composition as the body and including at least one glass forming oxide selected from the class consisting of $SiO_2$, $Al_2O_3$, $B_2O_3$ and $P_2O_5$.

21. A semicrystalline ceramic body comprising, on the oxide basis, 30–90 cationic mole percent of the constituents of zirconate selected from the class consisting of $CdZrO_3$, $BaZrO_3$ and $PbZrO_3$, at least 30 cationic mole percent of said body comprising at least one of said zirconates as a crystalline phase uniformly dispersed in another phase, said crystalline phase being crystallized in situ in a homogeneous glass having the same oxide composition as the body and including at least one glass forming oxide selected from the class consisting of $SiO_2$, $Al_2O_3$, $B_2O_3$ and $P_2O_5$.

22. A semicrystalline ceramic body comprising, on the oxide basis, 30–90 cationic mole percent of the constituents of tungstic oxide, at least 30 cationic mole percent of the said body comprising said tungstic oxide as a crystalline phase uniformly dispersed in another phase, said crystalline phase being crystallized in situ in a homogeneous glass having the same oxide composition as the body and including at least one glass forming oxide selected from the class consisting of $SiO_2$, $Al_2O_3$, $B_2O_3$ and $P_2O_5$.

23. A capacitor comprising a plurality of electrically conducting layers each separated by a semicrystalline ceramic dielectric, input and output terminals respectively connected to two of said electrically conducting layers, the remaining electrically conducting layers each being connected to one of said terminals, the semicrystalline dielectric comprising a body as defined in claim 18.

24. A capacitor comprising a plurality of electrically conducting layers each separated by a semicrystalline ceramic dielectric, input and output terminals respectively connected to two of said electrically conducting layers, the remaining electrically conducting layers each being connected to one of said terminals, the semicrystalline dielectric comprising a body as defined in claim 19.

25. A capacitor comprising a plurality of electrically conducting layers each separated by a semicrystalline ceramic dielectric, input and output terminals respectively connected to two of said electrically conducting layers, the remaining electrically conducting layers each being connected to one of said terminals, the semicrystalline dielectric comprising a body as defined in claim 20.

26. A capacitor comprising a plurality of electrically conducting layers each separated by a semicrystalline ceramic dielectric, input and output terminals respectively connected to two of said electrically conducting layers, the remaining electrically conducting layers each being connected to one of said terminals, the semicrystalline dielectric comprising a body as defined in claim 21.

27. A capacitor comprising a plurality of electrically conducting layers each separated by a semicrystalline ceramic dielectric, input and output terminals respectively connected to two of said electrically conducting layers, the remaining electrically conducting layers each being connected to one of said terminals, the semicrystalline dielectric comprising a body as defined in claim 22.

28. The method of making a capacitor which comprises assembling alternate layers of an electrically conducting material and a sheet of glass comprising, on the oxide basis, 30–90 cationic mol percent of the constituent oxides of at least one oxygen-octahedra ferroelectric compound, and including at least one glass-forming oxide, at least one of said conducting layers being attached to one metal lead, and at least one other conducting layer being attached to a second metal lead, heating the assembly sufficiently above the softening point of the glass to soften it and fuse the edges of the glass laminations together and seal them to the leads and thereafter exposing the assembly to a temperature between the peak temperature of crystallization the bottom of the first melting dip of the DTA curve of the ferroelectric compound and about 50° C. below the glass for a time ranging from at least one hour at the lower of said temperatures to at least one-half minute at the higher of said temperatures to crystallize the ferroelectric compound, and cooling the assembly.

29. The method of making a capacitor which comprises assembling alternate layers of an electrically conducting material and a sheet of glass comprising, on the oxide basis, 30–90 cationic mol percent of the constituents of at least one oxygen-octahedra ferroelectric compound, and including at least one glass-forming oxide selected from the class consisting of $SiO_2$, $Al_2O_3$, $B_2O_3$ and $P_2O_5$, at least one of said conducting layers being attached to one metal lead, and at least one other conducting layer being attached to a second metal lead, heating the assembly sufficiently above the softening point of the glass to soften it and fuse the edges of the glass laminations and seal them to the leads and thereafter exposing the assembly to temperature between the peak temperature of crystallization of the ferroelectric compound and about 50° C. below the bottom of the first melting dip of the DTA curve of the glass for a time ranging from at least one hour at the lower of said temperatures to at least one-half minute at the higher of said temperatures to crystallize the ferroelectric compound, and cooling the assembly.

30. A glass which, on the oxide basis in cationic mol percent, comprises 30–45% BaO, 15–40% $TiO_2$, 7–26% $SiO_2$, 3–30% $AlO_{1.5}$, the amount of $AlO_{1.5}$ not differing from the amount of $SiO_2$ by more than ⅓ of the amount of $SiO_2$, and 0.5–1.5% fluorine, the total BaO, $TiO_2$, $SiO_2$, $AlO_{1.5}$ and F being at least 90%.

31. A glass which, on the oxide basis in cationic mol percent, comprises 30–45% BaO, 15–40% $TiO_2$, the amount of BaO being 0–100% in excess of the 1/1 stoichiometric equivalent of $BaTiO_3$ based on the amount of $TiO_2$ present, said excess preferably being higher the lower the amount of $TiO_2$, 7–26% $SiO_2$, 3–30% $AlO_{1.5}$, the amount of $AlO_{1.5}$ not differing from the amount of $SiO_2$ by more than about ⅓ of the amount of $SiO_2$, and 0.5–1.5% fluorine, the total BaO, $TiO_2$, $SiO_2$, $TlO_{1.5}$ and F being at least 90%.

32. A glass which, on the oxide basis in cationic mol percent comprises 30–40% BaO, 15–40% $TiO_2$, the amount of BaO being 0–100% in excess of the 1/1 stoichiometric equivalent of $BaTiO_3$ based on the amount of $TiO_2$ present, said excess preferably being higher the lower the amount of $TiO_2$, 9.5–26% $SiO_2$ and 7–25% $AlO_{1.5}$, the amount of $AlO_{1.5}$ not differing from the amount of $SiO_2$ by more than about ⅓ of the amount of $SiO_2$, the total BaO, $TiO_2$, $SiO_2$ and $AlO_{1.5}$ being at least 90%.

References Cited by the Examiner
UNITED STATES PATENTS

| | | | |
|---|---|---|---|
| 2,563,307 | 8/51 | Burnham et al. | 106—39 |
| 2,663,658 | 12/53 | Schurecht | 117—70 |
| 2,920,971 | 1/60 | Stookey | 106—39 |
| 2,956,219 | 10/60 | Cianchi | 317—258 |
| 3,000,745 | 9/61 | Cianchi | 106—39 |

TOBIAS E. LEVOW, *Primary Examiner.*